US006380280B1

(12) United States Patent
Kapusniak et al.

(10) Patent No.: US 6,380,280 B1
(45) Date of Patent: Apr. 30, 2002

(54) INK JET RECORDING ELEMENT

(75) Inventors: Richard J. Kapusniak, Webster; Jeanne E. Kaeding, Rochester; John L. Muehlbauer, Stafford; Dennis E. Smith, Rochester; Gregory E. Missell, Penfield, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/607,417

(22) Filed: Jun. 30, 2000

(51) Int. Cl.[7] .......................... C08L 29/04; C08L 33/08; C08L 33/10; C08L 25/04; B32B 27/30

(52) U.S. Cl. ....................... 523/201; 524/523; 524/503; 524/556; 524/557; 524/548; 428/195

(58) Field of Search ................................ 523/160, 161, 523/201; 428/195, 212, 332, 402; 524/503, 504, 523, 555, 556, 557, 548

(56) References Cited

U.S. PATENT DOCUMENTS

| | | | | | |
|---|---|---|---|---|---|
| 4,701,837 | A | * | 10/1987 | Sakaki et al. | 347/105 |
| 5,027,131 | A | | 6/1991 | Hasegawa et al. | |
| 5,194,317 | A | | 3/1993 | Sato et al. | |
| 5,478,631 | A | * | 12/1995 | Kawano et al. | 428/212 |
| 5,888,629 | A | * | 3/1999 | Lubar | 428/327 |
| 5,910,359 | A | * | 6/1999 | Kobayashi et al. | 428/327 |
| 5,912,071 | A | * | 6/1999 | Takeshita et al. | 428/304.4 |
| 5,985,425 | A | * | 11/1999 | Tomizawa et al. | 428/212 |
| 6,099,956 | A | * | 8/2000 | Jones | 428/323 |

* cited by examiner

*Primary Examiner*—Vasu Jagannathan
*Assistant Examiner*—Callie E. Shosho
(74) *Attorney, Agent, or Firm*—Harold E. Cole

(57) ABSTRACT

An ink jet recording element comprising a support having thereon an image-receiving layer comprising at least about 80% by weight of non-porous polymeric particles in a polymeric binder, the non-porous polymeric particles having a core/shell structure comprising a polymeric core covered with a shell of a water-soluble polymer.

9 Claims, No Drawings

INK JET RECORDING ELEMENT

CROSS REFERENCE TO RELATED APPLICATIONS

Reference is made to commonly assigned, co-pending U.S. patent application Ser. Nos.:

Ser. No. 09/608,527 by Missell et al., filed of even date herewith, entitled "Ink Jet Printing Method";

Ser. No. 09/608,465 by Missell et al., filed of even date herewith, entitled "Ink Jet Printing Method";

Ser. No. 09/608,842 by Missell et al., filed of even date herewith, entitled "Ink Jet Printing Method";

Ser. No. 09/607,416 by Missell et al., filed of even date herewith, entitled "Ink Jet Printing Method";

Ser. No. 09/608,969 by Kapusniak et al., filed of even date herewith, entitled "Ink Jet Recording Element";

Ser. No. 09/607,419 by Kapusniak et al., filed of even date herewith, entitled "Ink Jet Recording Element"; and 09/608,466 by Kapusniak et al., filed of even date herewith, entitled "Ink Jet Recording Element";

the disclosures of which are hereby incorporated by reference.

FIELD OF THE INVENTION

This invention relates to an ink jet recording element. More particularly, this invention relates to an ink jet recording element containing polymeric particles.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol or mixtures thereof An ink jet recording element typically comprises a support having on at least one surface thereof an ink-receiving or image-forming layer, and includes those intended for reflection viewing, which have an opaque support, and those intended for viewing by transmitted light, which have a transparent support.

While a wide variety of different types of image-recording elements for use with ink jet devices have been proposed heretofore, there are many unsolved problems in the art and many deficiencies in the known products which have limited their commercial usefulness.

It is well known that in order to achieve and maintain photographic-quality images on such an image-recording element, an ink jet recording element must:

Be readily wetted so there is no puddling, i.e., coalescence of adjacent ink dots, which leads to non-uniform density Exhibit no image bleeding Absorb high concentrations of ink and dry quickly to avoid elements blocking together when stacked against subsequent prints or other surfaces Exhibit no discontinuities or defects due to interactions between the support and/or layer(s), such as cracking, repellencies, comb lines and the like Not allow unabsorbed dyes to aggregate at the free surface causing dye crystallization, which results in bloom or bronzing effects in the imaged areas Have an optimized image fastness to avoid fade from contact with water or radiation by daylight, tungsten light, or fluorescent light An ink jet recording element that simultaneously provides an almost instantaneous ink dry time and good image quality is desirable. However, given the wide range of ink compositions and ink volumes that a recording element needs to accommodate, these requirements of ink jet recording media are difficult to achieve simultaneously.

Ink jet recording elements are known that employ porous or non-porous single layer or multilayer coatings that act as suitable image-receiving layers on one or both sides of a porous or non-porous support. Recording elements that use non-porous coatings typically have good image quality but exhibit poor ink dry time. Recording elements that use porous coatings exhibit superior dry times, but typically have poorer image quality and are prone to cracking.

U.S. Pat. No. 5,194,317 relates to an ink jet recording sheet which contains polystyrene beads on a transparent support. However, there is no disclosure of core/shell particles.

U.S. Pat. No. 5,027,131 relates to an ink jet recording medium containing polymeric particles in an ink recording layer. Again, however, there is no mention of core/shell particles.

It is an object of this invention to provide an ink jet recording element that has a fast ink dry time with minimal puddling. It is another object of this invention to provide an ink jet recording element that is free from cracking.

SUMMARY OF THE INVENTION

These and other objects are achieved in accordance with the invention which comprises an ink jet recording element comprising a support having thereon an image-receiving layer comprising at least about 80% by weight of non-porous polymeric particles in a polymeric binder, the non-porous polymeric particles having a core/shell structure comprising a polymeric core covered with a shell of a water-soluble polymer.

Using the invention, an ink jet recording element is obtained which has less cracking than prior art elements while providing good image quality and fast ink dry times with minimal puddling.

DETAILED DESCRIPTION OF THE INVENTION

The support used in the ink jet recording element of the invention may be opaque, translucent, or transparent. There may be used, for example, plain papers, resin-coated papers, various plastics including a polyester resin such as poly (ethylene terephthalate), poly(ethylene naphthalate) and poly(ester diacetate), a polycarbonate resin, a fluorine resin such as poly(tetra-fluoro ethylene), metal foil, various glass materials, and the like. In a preferred embodiment, the support is opaque. The thickness of the support employed in the invention can be from about 12 to about 500 $\mu$m, preferably from about 75 to about 300 $\mu$m.

The non-porous polymeric particles which are used in the invention comprise a polymeric core covered with a shell of a water-soluble polymer. The polymeric core of the non-porous polymeric particles are in the form of beads, or irregularly shaped particles.

Polymers which can be used as a core for the core/shell particles used in the invention comprise, for example, acrylic resins, styrenic resins, or cellulose derivatives, such as cellulose acetate, cellulose acetate butyrate, cellulose propionate, cellulose acetate propionate, and ethyl cellulose; polyvinyl resins such as polyvinyl chloride, copolymers of vinyl chloride and vinyl acetate and polyvinyl butyral, polyvinyl acetal, ethylene-vinyl acetate copolymers, ethylene-vinyl alcohol copolymers, and ethylene-allyl copolymers such as ethylene-allyl alcohol copolymers, ethylene-allyl acetone copolymers, ethylene-allyl benzene copolymers, ethylene-allyl ether copolymers, ethylene acrylic copolymers and polyoxy-methylene; polycondensation polymers, such as, polyesters, including polyethylene terephthalate, polybutylene terephthalate, polyurethanes and polycarbonates.

In a preferred embodiment of the invention, the polymeric core is made from a styrenic or an acrylic monomer. Any suitable ethylenically unsaturated monomer or mixture of monomers may be used in making such styrenic or acrylic polymer. There may be used, for example, styrenic compounds, such as styrene, vinyl toluene, p-chlorostyrene, vinylbenzylchloride or vinyl naphthalene; or acrylic compounds, such as methyl acrylate, ethyl acrylate, n-butyl acrylate, n-octyl acrylate, 2-chloroethyl acrylate, phenyl acrylate, methyl-α-chloroacrylate, methyl methacrylate, ethyl methacrylate, butyl methacrylate; and mixtures thereof. In another preferred embodiment, methyl methacrylate is used.

If desired, a suitable crosslinking monomer may be used in forming the polymeric core in order to modify the non-porous polymeric particle to produce particularly desired properties. Typical crosslinking monomers are aromatic divinyl compounds such as divinylbenzene, divinylnaphthalene or derivatives thereof; diethylene carboxylate esters and amides such as ethylene glycol dimethacrylate, diethylene glycol diacrylate, and other divinyl compounds such as divinyl sulfide or divinyl sulfone compounds. Divinylbenzene and ethylene glycol dimethacrylate are especially preferred. While the crosslinking monomer may be used in any amount, at least about 27 mole % is preferred.

The non-porous polymeric particles used in this invention have a polymeric core that can be prepared, for example, by pulverizing and classification of organic compounds, by emulsion, suspension, and dispersion polymerization of organic monomers, by spray drying of a solution containing organic compounds, or by a polymer suspension technique which consists of dissolving an organic material in a water immiscible solvent, dispersing the solution as fine liquid droplets in aqueous solution, and removing the solvent by evaporation or other suitable techniques. The bulk, emulsion, dispersion, and suspension polymerization procedures are well known to those skilled in the polymer art and are taught in such textbooks as G. Odian in "Principles of Polymerization", 2nd Ed. Wiley (1981), and W. P. Sorenson and T. W. Campbell in "Preparation Method of Polymer Chemistry", 2nd Ed, Wiley (1968).

The shell which covers the polymeric core described above can be formed using a variety of techniques known in the art. The water-soluble polymer shell of the core/shell particles generally cannot be formed on the polymeric core merely by contacting a pre-formed core with the water-soluble polymer. Instead, conditions need to be established where the water-soluble polymer chemically reacts with the core surface or is strongly adsorbed thereto. Such conditions are known to one skilled in the art and can be achieved using a chemically reactive core surface and binder polymer. The non-porous polymeric particles may also comprise a core which is prepared in the presence of the water-soluble polymer so that the shell is formed during core formation rather than after core formation. Examples of techniques which can be used in making core/shell particles may be found, for example, in U.S. Pat. Nos. 5,872,189; 5,185,387 and 5,990,202, the disclosures of which are hereby incorporated by reference.

A preferred method of preparing the non-porous polymeric particles having a core/shell structure used in this invention includes forming a suspension or dispersion of ethylenically unsaturated monomer droplets in an aqueous medium, where the aqueous medium contains an amount of the desired water-soluble polymer, and polymerizing the monomer to form solid, non-porous polymer particles having a core/shell structure. The water-soluble polymer can also be added to the aqueous media subsequent to the formation of the droplets and before the commencement of the polymerization reaction.

The water-soluble polymer used for the shell of the polymeric particles used in the invention can be any naturally occurring or synthetic polymer which is soluble in water. For example, the water-soluble polymer may be a poly(vinyl alcohol), a gelatin, a cellulose ether, polyvinylpyrrolidone, poly(ethylene oxide), etc. In a preferred embodiment, the water-soluble polymer is a poly (vinyl alcohol). In general, the shell material comprises up to about 5% by weight of the core/shell particle.

In addition to the water-soluble polymer shell, the polymeric core surface may be covered with a layer of colloidal inorganic particles as described in U.S. Pat. Nos. 5,288,598; 5,378,577; 5,563,226 and 5,750,378, the disclosures of which are incorporated herein by reference. The polymeric core may also be covered with a layer of colloidal polymer latex particles as described in U.S. Pat. No. 5,279,934, the disclosure of which is incorporated herein by reference.

The non-porous polymeric particles used in this invention will usually have a median diameter of less than about 5.0 μm, preferably less than about 1.0 μm.

As noted above, the polymeric particles used in the invention are non-porous. By non-porous is meant a particle which is either void-free or not permeable to liquids. These particles can have either a smooth or a rough surface.

The polymeric binder used in the invention may comprise the same materials listed above for the shell materials. For example, the binder may be a poly(vinyl alcohol), a gelatin, a cellulose ether, polyvinylpyrrolidone, poly(ethylene oxide), etc. The image-receiving layer may also contain additives such as pH-modifiers like nitric acid, cross-linkers, rheology modifiers, surfactants, UV-absorbers, biocides, lubricants, water-dispersible latexes, mordants, dyes, optical brighteners etc.

The image-receiving layer may be applied to one or both substrate surfaces through conventional pre-metered or post-metered coating methods such as blade, air knife, rod, roll, slot die, curtain, slide, etc. The choice of coating process would be determined from the economics of the operation and in turn, would determine the formulation specifications such as coating solids, coating viscosity, and coating speed.

The image-receiving layer thickness may range from about 5 to about 100 μm, preferably from about 10 to about 50 μm. The coating thickness required is determined through the need for the coating to act as a sump for absorption of ink solvent.

Ink jet inks used to image the recording elements of the present invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

Although the recording elements disclosed herein have been referred to primarily as being useful for ink jet printers, they also can be used as recording media for pen plotter assemblies. Pen plotters operate by writing directly on the surface of a recording medium using a pen consisting of a bundle of capillary tubes in contact with an ink reservoir.

The following example further illustrates the invention.

EXAMPLE

Preparation C-1—Synthesis of Control Polymeric Particles

To a beaker were added the following ingredients: 704 g methyl methacrylate, 1428 g ethylene glycol dimethacrylate, 57.6 g dioctyl ester of sodium sulfosuccinic acid, Aerosol OT-100®, 40 g hexadecane and 32 g 2,2'-azobis(2,4-dimethylvaleronitrile), Vazo 52® (DuPont Corp.). The ingredients were stirred until all the solids were dissolved. To this solution was added 6720 g distilled water. The mixture was then stirred with a marine prop type agitator for 10 minutes. The mixture was passed through a Crepaco® homogenizer operated at 350 kg/cm$^2$. A 1.5 kg aliquot of the resulting monomer droplet dispersion was taken out for further use as described below.

The balance of the mixture was then added to a 12 liter flask. The flask was placed into a constant temperature bath at 52° C. and stirred at 75 rev./min. for 16 hours to polymerize the monomer droplets into polymeric particles. The polymeric particles were measured by a particle size analyzer, Horiba LA-920®, and found to be 0.174 μm in median diameter.

Preparation 1—Synthesis of Core/Shell Polymeric Particles (Invention)

The 1.5 kg aliquot of monomer droplet dispersion from above was placed into a 3 liter flask and 150 g of 10% poly(vinyl alcohol) (PVA) solution, made from Gohsenol GH-23® (Gohsen Nippon of Japan), was added. The flask was then placed into a constant temperature bath at 52° C. and stirred at 75 rev./min. for 16 hours to polymerize the monomer droplets into a polymeric core, which is surrounded by a shell of PVA. The core/shell polymeric particles were measured by a particle size analyzer, Horiba LA-920®, and found to be 0.181 μm in median diameter.

Coating of Elements

Control Element C-1

A coating solution was prepared by mixing together the control polymeric particles of Preparation C-1 with a binder of a 10% PVA solution, made from Gohsenol GH-23®, and dry powder dihydroxydioxane crosslinking agent to crosslink the PVA binder. The resulting coating solution was 20% solids and 80% water. The weight fractions of the total solids in the solution were 0.88 parts from the solids contained in Preparation C-1, 0.10 parts from the solids contained in the 10% PVA solution, and 0.02 parts from dry dihydroxydioxane. The solution was stirred at room temperature for approximately 30 minutes before coating.

The solution was then coated on corona discharge-treated, photographic grade, polyethylene-coated paper using a wound wire metering rod and oven dried for 20 minutes at 60° C. This element was coated to a dry thickness of 21 μm.

Control Element C-2

This element was prepared the same as Control Element C-1 except that in the coating solution, the ratios of the components were changed so that the weight fractions of the total solids in the solution were 0.96 parts from the solids contained in Preparation C-1, 0.033 parts from the solids contained in the 10% PVA solution, and 0.007 parts from dry dihydroxydioxane. The element was coated to a dry thickness of 25 μm.

Element 1 (Invention)

This element was prepared the same as Control Element C-1 except that the coating solution was made with Preparation 1. In addition, the ratios of the components were changed so that the weight fractions of the total solids in the solution were 0.97 parts from the non-PVA solids contained in Preparation 1, 0.025 parts from the solids contained in the 10% PVA solution and the PVA solids contained in Preparation 1, and 0.005 parts from dry dihydroxydioxane. Element 1 was coated to a dry thickness of 25 μm.

Cracking Evaluation

The above coated elements were visually evaluated for presence of cracking.

Puddling Evaluation

Puddling is an undesirable effect where the coating does not fully absorb all the ink printed and the ink sits on top of the coating surface and coalesces. To evaluate this feature, the above coated elements were imaged on an Epson 740® inkjet printer using a control target of patches corresponding to 50, 75, 90, and 100% tints of each of the following colors: black, green, blue, red, magenta, cyan and yellow. The control target was printed using the driver setting for Photo Paper, 1440 dpi. The elements were visually examined and rated according to the following scale:

1: none of the patches exhibited puddling.

2: some, but not all, of the 100% tints exhibited puddling.

3: some, but not all, of the 90% tints exhibited puddling.

4: some, but not all, of the 75% tints exhibited puddling.

5: some, but not all, of the 50% tints exhibited puddling.

The following results were obtained:

TABLE

| Element | Puddling | Cracking |
|---|---|---|
| Control C-1 | 3 | No |
| Control C-2 | * | Yes |
| 1 | 2 | No |

*cracking too severe to print

The above results show that Control C-2 had cracking so severe that it could not be evaluated for puddling. Although Control C-1, having more PVA binder than C-2, exhibited no cracking, it had level 3 puddling. Element 1 of the invention had no cracking and only level 2 puddling.

This invention has been described with particular reference to preferred embodiments thereof but it will be understood that modifications can be made within the spirit and scope of the invention.

What is claimed is:

1. An ink jet recording element comprising a support having thereon an image-receiving layer comprising non-porous polymeric particles in a polymeric binder, said layer containing said non-porous polymeric particles in an amount of at least about 80% by weight, said non-porous polymeric particles having a core/shell structure comprising a polymeric core covered with a shell of a water-soluble polymer, wherein said polymeric core is made from a styrenic or an acrylic monomer, said polymeric core being crosslinked to a degree of crosslinking of at least about 27 mole %.

2. The element of claim 1 wherein said acrylic monomer comprises methyl methacrylate.

3. The element of claim 1 wherein said shell comprises up to about 5% by weight of said particles.

4. The element of claim 1 wherein said water-soluble polymer comprises a poly(vinyl alcohol), a gelatin, a cellulose ether, poly(vinyl pyrrolidone) or poly(ethylene oxide).

5. The element of claim 1 wherein said polymer binder comprises a poly(vinyl alcohol), a gelatin, a cellulose ether poly(vinyl pyrrolidone) or poly(ethylene oxide).

6. The element of claim 1 wherein said support is opaque.

7. The element of claim 1 wherein said non-porous polymeric particles have a particle size median diameter of less than about 5 μm.

8. The element of claim 1 wherein said non-porous polymeric particles have a particle size median diameter of less than about 1 μm.

9. The element of claim 1 wherein both said water-soluble polymer and said polymeric binder comprise the same material.

* * * * *